United States Patent [19]

Sellati

[11] Patent Number: 4,871,924

[45] Date of Patent: Oct. 3, 1989

[54] SAFETY POWER RECEPTACLE WITH HOT WIRE SWITCH-THROUGH

[76] Inventor: Christopher G. Sellati, 12281 S.W. 104 Ter., Miama, Fla. 33186

[21] Appl. No.: 135,924

[22] Filed: Dec. 21, 1987

[51] Int. Cl.[4] .................................... H02J 1/10

[52] U.S. Cl. ............................ 307/86; 307/125; 307/38; 307/66; 361/93

[58] Field of Search .................. 307/125, 23, 140, 93, 307/92, 86, 131; 361/92, 93

[56] References Cited

U.S. PATENT DOCUMENTS

| | | | |
|---|---|---|---|
| 3,416,001 | 12/1968 | Fistell | 307/38 |
| 4,054,802 | 10/1977 | Mock | 307/38 |
| 4,059,843 | 11/1977 | Girismen | 361/93 |
| 4,437,018 | 3/1984 | Manley | 307/38 |
| 4,466,046 | 8/1984 | Barthel et al. | 361/92 |
| 4,575,640 | 3/1986 | Martin | 307/86 |
| 4,675,537 | 6/1987 | Mione | 307/38 |

*Primary Examiner*—Bernard Roskoski

*Attorney, Agent, or Firm*—Oltman and Flynn

[57] ABSTRACT

Safety power outlet connected to a plurality of power lines and arranged to receive the prongs of a matching multi-pronged power plug has a receive terminal connected to each power line. The receive terminal is arranged to receive a corresponding prong of the power plug which upon insertion into the terminal operates a switch associated with each terminal. All switches are connected in series, and upon complete insertion of all the prongs, the series connected switches generate a connect signal which activates a power connection device that applies power to all high potential prongs, which in turn activates the external circuit connected to the power plug.

15 Claims, 4 Drawing Sheets

SAFETY POWER RECEPTACLE WITH HOT WIRE SWITCH-THROUGH

BACKGROUND AND PRIOR ART

The instant invention relates to an electrical power outlet and more particularly to a female power outlet arranged to become energized only when a male matching power plug is fully inserted therein.

It is well known that electrical power outlets can cause fires or injuries when metallic objects are accidentally inserted thereto, as may happen for example when children insert wires and other objects into the openings of the outlet provided for receiving the prongs of a matching power plug.

It is also well known to provide matching plugs and outlets that are arranged such that an electrical connection is not established until the male and female parts are joined and airtight, to avoid explosion and fire danger in case the plug and outlet are joined with power connected. U.S. Pat. No. 2,697,212 shows an explosion-proof connecting device. Other constructions are known from the prior art that provide explosion proof connections in varions ways.

The devices of the prior art, however, suffer from the drawback that they do not prevent accidental insertion of wires or metals from causing injury or fires because none of them insure that all power is removed from the outlet until the mating plug and outlet are completely joined together. The prior art devices also have the drawback that specially constructed mating plugs and outlets must be provided. This, clearly, is a disadvantage since so many electrical appliances are now provided with standard plugs, that it would be impractical to change them all in order to accommodate a new specially constructed outlet.

SUMMARY OF THE INVENTION

It is therefore a primary object of the instant invention to provide a special electrical outlet that is safely disconnected from the high potential power lines, until a standard electrical power plug has been fully inserted into the special outlet, constructed according to the instant invention.

In accordance with the instant invention there is provided an electric safety power outlet which is connected to a plurality of power lines, which may include one or more of them being connected to a high potential, such as phases of the power connection, and ground line and/or neutral line. The power outlet is typically contained in a housing and has a front surface having holes that are aligned with and arranged to receive the prongs of a matching male plug. The front surface may be extended to form a cover plate for mounting the outlet on a wall or other surface. The housing may alternatively be arranged to be connected to a flexible power cord instead of being mounted on a wall. Mounted in the housing and aligned with each hole there is a receive terminal serving to receive a respective prong of the plug. Each terminal is associated with a respective one of the power lines. All receive terminals have a normally open switch which is mechanically arranged to sense that the corresponding prong of the power plug is completely inserted into the terminal, which causes the switch to be closed. All the switches are connected in a series connection, having one end connected to either ground or a power line having a high potential on it through a limiting resistor and the other end producing a connect signal only when all switches in the series connections are closed. Each high potential power line has an electrical connected device inserted in the respective power line, which is responsive to the connect signal to close the connection between the terminal and the high potential line. The connecting device is advantageously a triac or a relay or any other controllable power connection device. It follows that a connecting device may also be inserted in the lower potential power lines, although this, for economical reasons may not be warranted.

In accordance with a further feature of the invention a light indicator is provided on the outlet which is connected between one of the high potential receive terminals and a low potential line. This indicator will glow when the power plug is inserted with all its prongs fully into the outlet to show that the safety mechanism is operating properly and that power is on. If the glow is not present with the plug fully inserted it is an indication that the power outlet is not fully operative or that the primary power connection is at fault.

In accordance with another feature, relating to one of the prongs of the electric plug, for example, the protective ground prong being missing, the safety outlet according to the invention will not be energized, and electric shock injury to a person operating the appliance with the missing ground prong may be prevented.

In accordance with still another feature, the safety power outlet is configured as a retrofit power receptacle having a plurality of backward facing prongs for insertion into an existing conventional power receptacle, and attached thereto by means of a screw received in a screw hole through the safety receptacle and in the threaded hole in the conventional receptacle used for holding the conventional front plate in place.

Further objects and advantages of this invention will be apparent from the following detailed description of the presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
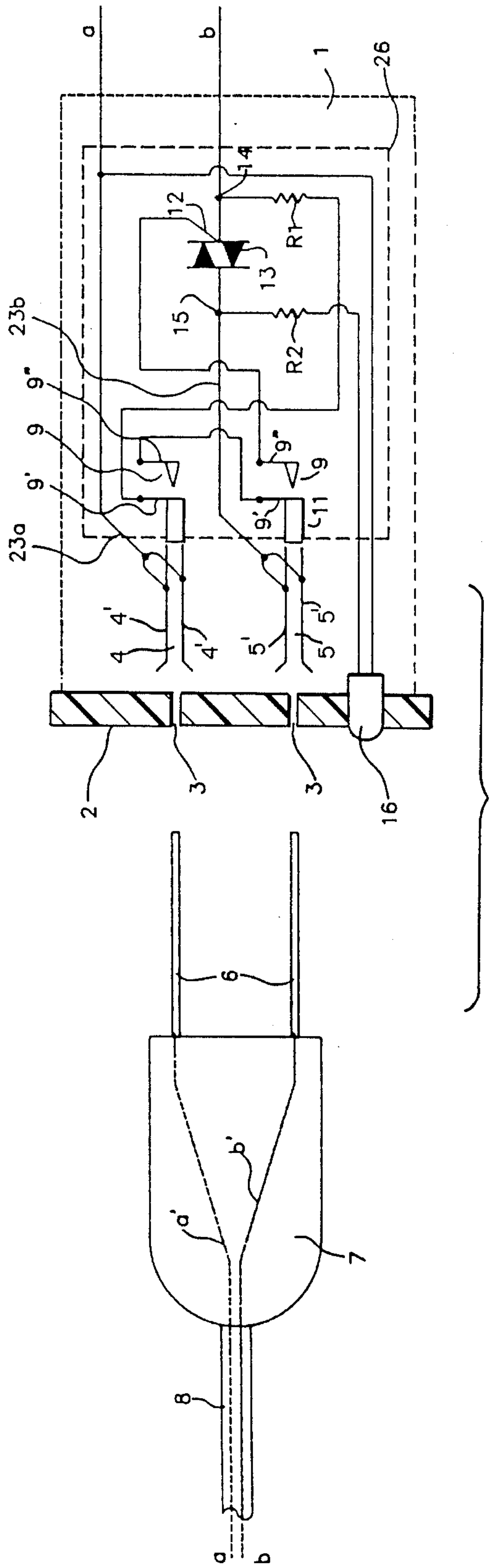
FIG. 1 is a schematic circuit diagram of the invention showing an electric outlet and an electric power plug.
Figure 2:
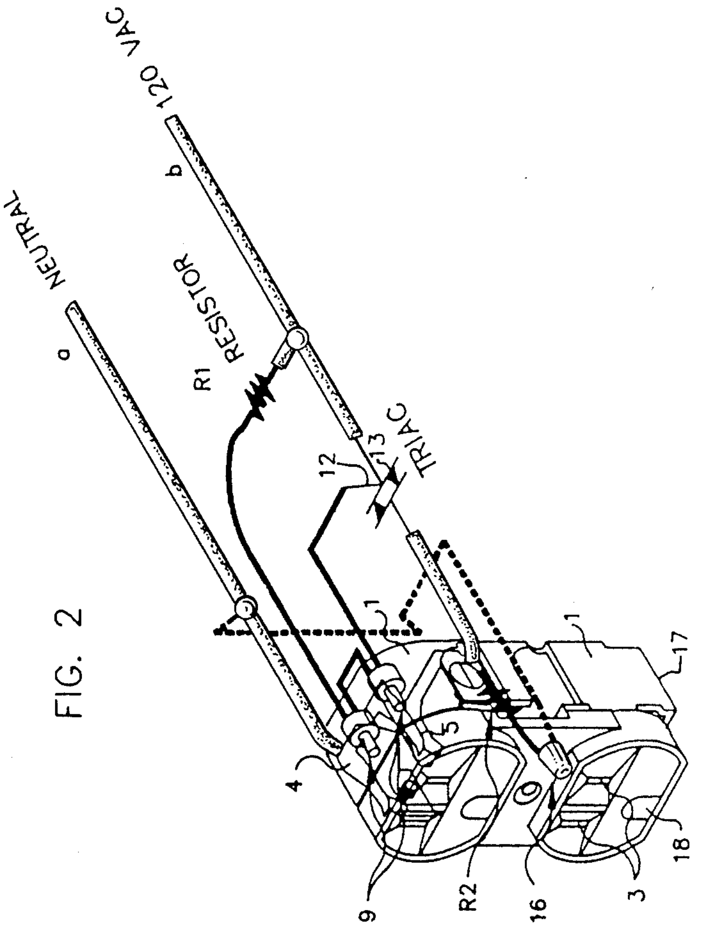
FIG. 2 is a diagrammatic perspective detailed wiring diagram of the invention.

In FIG. 1, the housing 1 is shown in phantom lines connected to a front plate 2, having receiving holes 3 aligned with receive terminals 4 & 5, each placed with its front end facing the respective receive hole 3. The receive holes 3 may have any one of the shapes prescribed by the current public standards for electric power outlets and plug, standard rectangular holes, as seen in FIG. 2.

Each receive terminal 4,5 includes two respective elongate blades 4',5', constructed to receive a corresponding prong 6 of an electric power plug 7, connected to a power cord 8, having two power lines a and b. The connection between the prongs 6 and the power lines a,b inside the plug 7 is shown in phantom lines a' and b'.

The prongs 6 are shaped to fit inside and make electrical contact with the receive terminals 4,5.

Two switches 9, each have a moving contact 9', a stationary contact 9'', and an insulating pusher 11 connected to the moving contact 9'. The contacts 9' and 9'' are shown in their open (i.e. non-contacting) condition. Two power lines a and b lead into the housing 1. Thee power line a represents a low potential line, such as ground or neutral, and is connected directly to the receive terminal 4; the power line b represents a high potential line, such as one or several power phases.

Figure 4:
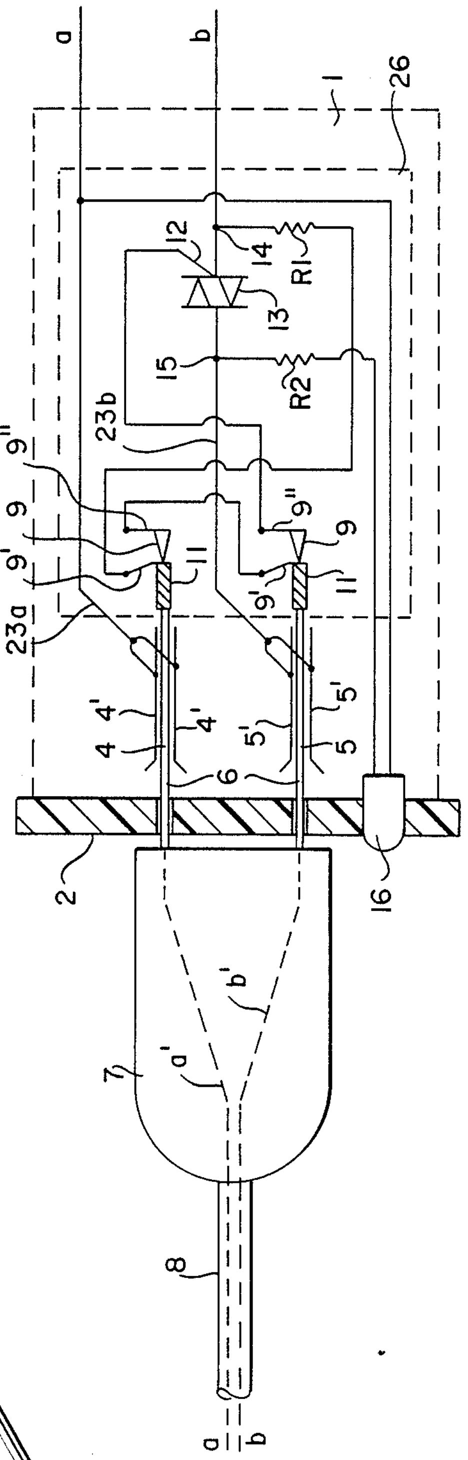
FIG. 4 is a view of the invention according to FIG. 1 showing the plug inserted into the outlet.

When the power plug 7 is inserted into the outlet 1, as shown in FIG. 4, the prongs 6, slide between the blades 4' and 5' of the receive terminals 4 & 5 and engage the respective pushers 11, which in turn causes the two switches 9 to close. The switches 9 are in series connection with a limiting resistor R1 connected to the high voltage line b, and to the a control terminal 12 of a connecting device, for example the gate terminal of a traic 13, so that, when both switches 9 and only then, are closed, a control current in the form of a connect signal is applied through the limiting resistor R1 and the series-connected switches 9 to the gate terminal 12 of the triac 13, which turns on and connects, through its power terminals 14 and 15, the high potentail power line b to the receive terminal 5, and thereby energizes a circuit or appliance connected through the plug 7 to the outlet 1.

An indicator light 16, advantageously in the form of a light-emitting diode 16, is connected in series with a second current-limiting resistor R2 between the high potential receive terminal 5 and the low potential line a. When the plug 7 is fully inserted in the outlet 1, the receive terminal 5 is energized, as described above, and the light indicator 16 is activated to show that the outlet 1 is operative and that the external circuit connected to the plug 7 is energized.

Figure 3:
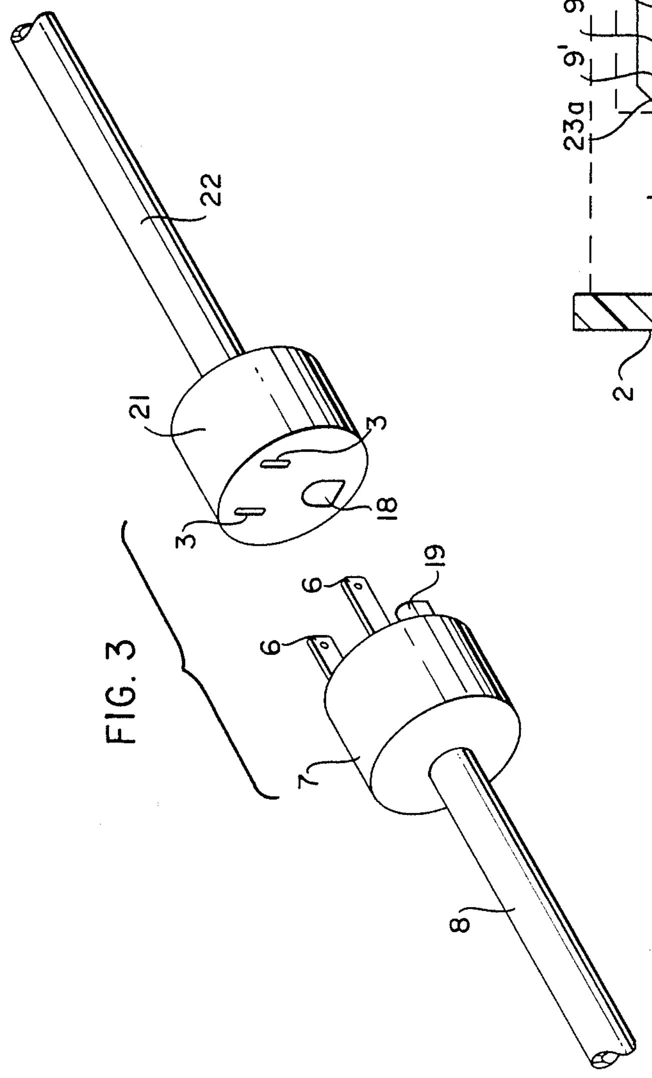
FIG. 3 is a perspective view of the invention showing a cord-mounted outlet and a matching plug, before insertion into the outlet.

FIG. 2 shows structural details of an embodiment of the invention having for example two combined outlets, of which only the upper one, for the sake of clarity, is shown with the protective circuit including the switches 9, shown as two small microswitchs a of very compact construction, mounted behind the respective receive terminals 4 and 5 formed of spring brass or similar metal, supported in a molded plastic structure as in conventional outlets. FIGS. 2 and 3 also show an additional connection for a protective ground, consisting of the ground prong 19, receivable in a ground hole 18 in the outlet 21, shown in this figure as a cord-connected outlet, connected to the cord 22. The plug 7 and outlets 17 and 21 each contain two low-potential power lines, namely ground and neutral, and one high-potential power line. In this embodiment, the ground line in the outlet is equipped with a switch 9 similar to the switches 9 already described for the high-potential line b and the neutral line a, seen in FIGS. 1 & 2.

Figure 5:
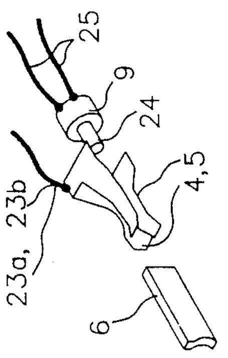
FIG. 5 is a fragmentary perspective detail view of a receive terminal with a switch behind it and a prong before insertion into the terminal.

In FIG. 5 a prong 6 is being inserted into a receiving terminal 4,5 consisting of two parallel blades 4',5' the two blades are spring biased together which finally serves for attachment of a wire 23*a*, 23*b*, which may be the respective power line a or the lead 23*b* from the power terminal 15 of the Triac 13, seen in FIG. 4. Upon complete insertion of the prong 6, the normally open microswitch 9 having a pusher 24 is being actuated and closes a connection between two terminals 25 of the microswitch as explained above.

Figure 6:
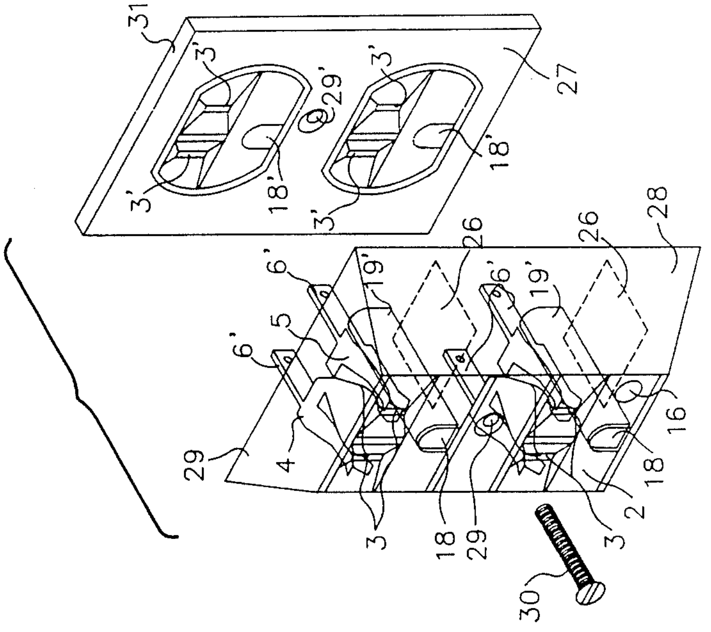
FIG. 6 is a perspective view of the invention showing a retrofit outlet that would plug into an existing conventional outlet.

FIG. 6 shows another preferred embodiment of the invention constructed such that it can be retrofitted to an existing conventional A/C duplex power outlet 27, thereby adding the protection of the invention to an existing wall outlet without the need for replacing an existing outlet.

In FIG. 6 the structure forming the safety power receptacle has been enclosed in a housing 28 as a retrofit receptacle 29, which contains all of the elements seen in FIGS. 1 and 4. For the sake of clarity the components shown within the inner dashed line box 26 of FIGS. 1 and 4 are shown only as dashed line boxes 26 in FIG. 6. Instead of the power lines a and b of FIG. 1 and 4, the retrofit receptacle 29 has backward facing prongs 6' and 19', each connected to a respective receive terminal 4,5. The existing power outlet 27 normally has a coverplate 31 secured to the wall by means of a screw (not shown), received in a screw hole 29' in the cover plate 31. Upon retrofitting the safety power receptacle the mounting screw holding the cover plate 31 is removed, the retrofit safety power receptacle is inserted with its prongs 6', 19' into the wall outlet 27, and secured thereto by means of a longer screw 30, inserted through a screw hole 29 in the safety power receptacle through the hole 29' in the existing outlet 27 and into the receiving threads of the outlet 27, thereby securely holding the safety receptacle 29 abutted with its backside against the front face of the existing receptacle 27 and the prongs of the safety receptacle inserted into the existing receptacle. With the safety receptacle thus installed in engagement with an existing receptacle all the safety features of the safety receptacle are conferred upon the existing receptacle without the need for replacing the existing power outlet.

The indicator light 16 may optionally also be provided on the retrofit receptacle, as seen in FIG. 6.

I claim:

1. A safety power outlet connected to a plurality of power lines for connection with a matching power plug, having an equal plurality of prongs, comprising: a receive terminal associated with each of the power lines; a front plate having a receive hole aligned with each receive terminal for receiving a respective prong: at least two series-connected switches, each having a movable contact; a pusher having two ends connected at one end to said moving contact, the other end disposed in proximity to a respective one of said receive terminals for generating a connect signal when each of said pushers is engaged by a respective prong being fully inserted into said receive terminal; and electrical connecting means being responsive to said connect signal for connecting at least one of said power lines with its respective receive terminal.

2. Power outlet according to claim 1 wherein said plurality of power lines include at least one high potential line and at least one low potential line.

3. Power outlet according to claim 2 wherein said switches include a normally open switch aligned with the respective receive terminal of at least one of said high potential lines and a normally open switch aligned with at least one of said low potential lines; each of said switches being closed in response to a prong being fully inserted in said receive terminal, all of said switches forming a series connection having two ends, a first current-limiting resistor being connected in said series connection, one of said ends being connected to one of said power lines, the other end of said series connection forming said connect signal.

4. Power outlet according to claim 3 wherein said switches include a triac having two power terminals and a gate terminal, inserted with its power terminals between said high potential line and said receive terminal, and the gate terminal connected with said connect signal.

5. Power outlet according to claim 1 including a light indicator for indicating visibly the presence of high potential on at least one of said receive terminals connected with a high potential line when said matching power plug is fully inserted in the outlet; said light indicator having two terminals, one of which is connected with one of said low potential lines, and the other one of which is connected with said receive terminal connected with said high potential line, for indicating operability of said power outlet upon insertion of said power plug.

6. Power outlet according to claim 5 including another limiting resistor in series with said light indicator.

7. Power outlet according to claim 6 wherein said light indicator is a light-emitting diode.

8. Power outlet according to claim 3 wherein said first limiting resistor is connected to said high potential line.

9. Power outlet according to claim 1 wherein said housing includes a mounting plate for mounting said outlet on a surface.

10. Power outlet according to claim 1 wherein said housing is a power cord-attached housing.

11. A safety power outlet according to claim 1 including a plurality of backward facing prongs, equal to the plurality of prongs in said power plug, for insertion into an existing power receptacle, each of said backward facing prongs being electrically connected with a respective one of said receive terminals.

12. A safety outlet according to claim 11 including a housing for enclosing said safety power outlet, and a screw hole through said housing for receiving a mounting screw for securing the safety receptacle to the existing outlet.

13. A safety outlet according to claim 11 being a duplex outlet.

14. A safety outlet according to claim 12 being a duplex outlet.

15. A safety outlet according to claim 11 including a light indicator for indicating visibly the presence of high potential on at least one of said receive terminals connected with a high potential line.

* * * * *